(12) United States Patent
Ashok et al.

(10) Patent No.: US 10,696,838 B2
(45) Date of Patent: Jun. 30, 2020

(54) RUBBER COMPOSITIONS CONTAINING TACKIFIERS

(71) Applicant: Hexion Inc., Columbus, OH (US)

(72) Inventors: Reddy Ashok, Louisville, KY (US); Craig Zirkle, New Salisbury, IN (US); Justyne Willman, Georgetown, IN (US)

(73) Assignee: HEXION INC., Columbus, OH (US)

( * ) Notice: Subject to any disclaimer, the term of this patent is extended or adjusted under 35 U.S.C. 154(b) by 0 days.

(21) Appl. No.: 15/727,329

(22) Filed: Oct. 6, 2017

(65) Prior Publication Data

US 2019/0106566 A1    Apr. 11, 2019

(51) Int. Cl.
- *C08L 61/06* (2006.01)
- *C08L 9/00* (2006.01)
- *C08L 7/00* (2006.01)
- *B60C 1/00* (2006.01)

(52) U.S. Cl.
CPC ............ *C08L 61/06* (2013.01); *B60C 1/0016* (2013.01); *B60C 1/0025* (2013.01); *C08L 7/00* (2013.01); *C08L 9/00* (2013.01); *B60C 1/00* (2013.01)

(58) Field of Classification Search
CPC ... C08G 8/04; C08L 61/06; C08L 9/00; B60C 1/00
See application file for complete search history.

(56) References Cited

U.S. PATENT DOCUMENTS

| | | | |
|---|---|---|---|
| 2,131,249 A | 9/1938 | Balle | |
| 3,708,554 A | 1/1973 | Oguri et al. | |
| 4,239,869 A * | 12/1980 | Annis | C08G 8/00 264/328.2 |
| 4,448,951 A | 5/1984 | Rupert et al. | |
| 4,740,424 A * | 4/1988 | Schumacher | C09D 175/04 428/419 |
| 5,135,673 A | 8/1992 | Murata et al. | |
| 5,412,058 A | 2/1995 | Dreyfus et al. | |
| 6,828,383 B2 | 6/2004 | Durairaj et al. | |
| 7,074,861 B2 | 7/2006 | Durairaj et al. | |
| 7,498,371 B2 | 3/2009 | Durairaj et al. | |
| 2004/0162391 A1* | 8/2004 | Durairaj | C08G 8/22 525/139 |
| 2005/0137379 A1 | 6/2005 | Howard et al. | |
| 2008/0090967 A1* | 4/2008 | Dailey | C08G 8/22 525/139 |
| 2009/0198008 A1 | 8/2009 | Matsumoto | |
| 2012/0264864 A1 | 10/2012 | Vergelati et al. | |
| 2014/0080965 A1 | 3/2014 | Yunfeng et al. | |
| 2016/0090474 A1* | 3/2016 | Sato | C08L 9/00 523/156 |
| 2017/0121443 A1 | 5/2017 | Reddy et al. | |

FOREIGN PATENT DOCUMENTS

| | | |
|---|---|---|
| EP | 0400773 B1 | 8/1994 |
| GB | 721713 A | 1/1955 |
| GB | 790644 | 2/1958 |
| JP | H02248417 | 10/1990 |
| JP | 1992363240 A | 12/1992 |
| KR | 20150135914 A * | 12/2015 |
| RU | 2493177 | 9/2013 |
| SU | 39116 | 10/1934 |
| SU | 317678 | 10/1971 |
| WO | WO2004/018402 A1 | 3/2004 |
| WO | WO2008/048839 A1 | 4/2008 |
| WO | WO2009/155747 | 12/2009 |
| WO | WO-2015197295 A1 * | 12/2015 |

OTHER PUBLICATIONS

Machine Translation of KR 20150135914 (Year: 2015).*

* cited by examiner

*Primary Examiner* — Michael M Dollinger

(57) ABSTRACT

A composition comprising, a rubber component selected from the group consisting of a rubber polymer, a synthetic rubber polymer, and combinations thereof; and an alkylphenol resin which is a reaction product of: at least one phenolic monomer selected from the group consisting of phenol, cresol, resorcinol, xylenol, ethyl phenol, alkylresorcinols, and combinations thereof; and at least one alkyl aldehyde having from 5 to 12 carbon atom alkyl groups, is disclosed. The composition can be used to prepare articles of manufacture such as tires, tire treads, tire shoulders, tire sidewalls, rubber belts, and rubber hoses.

10 Claims, No Drawings

RUBBER COMPOSITIONS CONTAINING TACKIFIERS

BACKGROUND OF THE INVENTION

Field of the Invention

The invention relates to rubber compositions. The invention particularly relates to rubber compositions that contain tackifiers.

Background

Typically, alkylphenol resins derived from condensing octylphenol or nonylphenol with formaldehyde are used in tire and rubber compositions as tackifiers. However, octylphenols and nonylphenols have recently been subject to regulatory control. Octylphenols are known to be of environmental concern. In Europe, para-tert-octylphenol has been classified as a Category-1 Acute and Chronic Environmental Hazard. Additionally, it is recommended that the use of octylphenols be phased out under the OSPAR Convention, and it is listed as a substance for priority action under the Helsinki Convention, which protects the marine environments of the north-east Atlantic Ocean and Baltic Sea respectively.

Nonylphenols are also of environmental concern. The United States Environmental Protection Agency has taken the position that nonylphenol persists in the environment, particularly in the aquatic environment and that it is moderately bioaccumulative and extremely toxic to aquatic organisms. It is also the Environment Protection Agency's position that nonylphenol exhibits estrogenic properties in both in vitro and in vivo assays.

On Sep. 25, 2014, the Environmental Protection Agency proposed a Significant New Use Rule to require an in-agency review before a manufacturer starts or resumes use of 15 nonylphenols (NPs) and nonylphenol ethoxylates (NPEs). Therefore, tackifiers prepared from alkylphenol resins having little or no octylphenol or nonylphenol monomers would be desirable.

SUMMARY

In one broad embodiment of the invention, there is disclosed a composition comprising, consisting of, or consisting essentially of a rubber component selected from the group consisting of a rubber polymer, a synthetic rubber polymer, and combinations thereof; and an alkylphenol resin which is a reaction product of: at least one phenolic monomer selected from the group consisting of phenol, cresol, resorcinol, xylenol, ethyl phenol, alkylresorcinols, and combinations thereof; and at least one alkyl aldehyde having from 5 to 12 carbon atom alkyl groups.

Also disclosed is an article of manufacture prepared using the above-mentioned composition wherein the article is selected from the group consisting of a tire, a tire tread, a tire shoulder, a tire sidewall, a rubber belt, and a rubber hose.

Also disclosed is the use of an alkylphenol resin which is a reaction product of: at least one phenolic monomer selected from the group consisting of phenol, cresol, resorcinol, xylenol, ethyl phenol, alkylresorcinols, and combinations thereof; and at least one alkyl aldehyde having from 5 to 12 carbon atom alkyl groups in a composition comprising a rubber component selected from the group consisting of a rubber polymer, a synthetic rubber polymer, and combinations thereof.

DESCRIPTION

In the present invention, there is disclosed a composition comprising, consisting of, or consisting essentially of a rubber component selected from the group consisting of a rubber polymer, a synthetic rubber polymer, and combinations thereof; and an alkylphenol resin which is a reaction product of: at least one phenolic monomer selected from the group consisting of phenol, cresol, resorcinol, xylenol, ethyl phenol, alkylresorcinols, and combinations thereof; and at least one alkyl aldehyde having from 5 to 12 carbon atom alkyl groups.

The alkylphenol resin is a reaction product of at least one alkyl aldehyde and at least one phenolic monomer selected from the group consisting of phenol, cresol, resorcinol, xylenol, ethyl phenol, alkyl resorcinols, isomers thereof, and combinations thereof. Suitable isomers include ortho-, meta-, and para-isomers, such as ortho-, meta-, and para-cresol.

For the purposes of the application, alkyl resorcinols are dihydroxy benzenes having one or two alkyl chains present on the ring. The alkyl chains can have from 1 to 3 carbons.

The alkyl aldehydes that can be used are any aldehydes having from 5 to 12 carbon atom alkyl groups. In various embodiments, the alkyl aldehydes can be selected from the group consisting of 3,5,5-trimethyl hexanal, nonanal, 2-ethyl hexanal, and combinations thereof.

The alkylphenol resins can be in the form of novolac and resole resins. Resole resins are formed when prepared using a base catalyst and novolacs when prepared using an acid catalyst.

Also, with the reaction of the phenolic monomer with an alkyl aldehyde to produce alkylphenol resins, the molar ratio of the reactants used in reaction can, in various embodiments, determine the molecular structure and physical properties of the resin. When it is desirable to prepare a novolac type resin, an aldehyde:phenol ratio between 0.5:1 and 1:1 (such as 0.5:1 to 0.8:1) with an acid catalyst will form novolac resins, which are thermoplastic in character. A higher aldehyde:phenol ratio (for example, more than 1:1 to 3:1) with a base catalyst will form resole resins, which are characterized by their ability to be thermally hardened at elevated temperatures.

In various embodiments, the alkylphenol resin is in the form of a formaldehyde free resin. For formaldehyde free alkylphenol resins, the mole ratio of aldehyde to phenolic monomers can be from about 0.75:1 to about 0.9:1, for example, 0.85:1. Alkylphenol resins free of formaldehyde have a molecular weight (Mw) of less than 2000 Daltons, such as from 1000 to less than 2000 Daltons.

In another embodiment, formaldehyde is used to form the alkylphenol resin. The formaldehyde-containing alkylphenol resins can be a novolac resin and a resole resin. The novolac resin can have a molecular weight from 2000 Daltons to 50000 Daltons and a resole resin can have a molecular weight from 2000 Daltons to 20000 Daltons.

The alkylphenol resins of the composition are free or substantially free of octylphenol or nonylphenol monomers. These resins can also be made free of formaldehyde.

Further information about alkylphenol resins and their preparation can be found in United States Patent Application Publication No. 2017/0121443, which is herein incorporated by reference in its entirety.

The alkylphenol resin can be present in the composition in the range of from 1 phr to 10 phr, from 2 phr to 8 phr in various embodiments, and from 2 phr to 6 phr in various other embodiments. 'Phr' stands for 'parts per hundred rubber.'

The composition of the application contains at least one polymer selected from the group consisting of a rubber polymer, a synthetic rubber polymer, and combinations thereof.

Natural rubber comprises polymers of isoprene. It is harvested in the form of a latex from rubber trees.

Synthetic rubbers can also be present in the composition. Synthetic rubbers are polymers synthesized from petroleum byproducts. Examples of synthetic rubber include, but are not limited to styrene butadiene rubber, polybutadiene rubber, halogenated butyl rubber, butyl rubber, polyisoprene rubber, styrene/isoprene/butadiene rubbers, and combinations thereof. In various embodiments, the rubber component can be hydrogenated or partially hydrogenated.

In various embodiments, when synthetic rubber and natural rubber are present in the composition together, they are present in a ratio of 9 parts synthetic rubber to 1 part natural rubber, 4 parts synthetic rubber to 1 part natural rubber in various embodiments, and 3 parts synthetic rubber to 2 parts natural rubber in various other embodiments.

The composition can also contain various types of chemicals typically used in the rubber industry. Examples include, but are not limited to vulcanizing agents, vulcanizing accelerators, antioxidants, pigments, and fillers.

The composition can be used to manufacture articles including but not limited to a tire, a tire tread, a tire shoulder, a tire sidewall, a rubber belt, and a rubber hose. The articles can be manufactured by any method known in the art.

The composition of the present application has a Shore A Hardness as measured by ASTM D2240 in the range of from 40 to 65, from 45 to 60 in various embodiments, and from 47 to 50 in various other embodiments.

The composition has a tensile strength as measured by ASTM D412 in the range of from 1700 to 2800 psi, from 2000 to 2700 psi in various embodiments, and from 2100 to 2600 psi in various other embodiments.

The composition has a Subjective Tack Test rating as measured by the thumb tack test (where 1 is the lowest rating and 10 is the highest rating) in the range of from 1 to 9, from 2 to 8 in various embodiments, and from 2 to 7 in various other embodiments.

For a tire to have a good wet grip and skid resistance, it is desired that the composition have a high tan δ at the temperatures of from 0° C. to 30° C. Additionally, for a tire to have low resistance to rolling, thereby providing better gas mileage, it is desirable that the composition have a low tan δ between the temperatures of from 60° C. to 80° C.

The composition has a tan δ at 0° C. as measured by Dynamic Mechanical Analysis (DMA) in the range of from 0.12 to 0.17, from 0.13 to 0.16 in various embodiments, and from 0.14 to 0.16 in various other embodiments.

The composition has a tan δ at 60° C. as measured by DMA in the range of from 0.10 to 0.16, from 0.11 to 0.14 in various embodiments, and from 0.11 to 0.13 in various other embodiments.

The composition has an ultimate elongation as measured by ASTM D412 in the range of from 550% to 800%, from 620% to 750% in various embodiments, and from 650% to 700% in various other embodiments.

The composition has a Mooney viscosity as measured by ASTM D1646 in the range of from 30 MU to 55 MU, from 35 to 50 MU in various embodiments, and from 40 to 47 MU in various other embodiments.

The composition has an elastic modulus at 60° C. as measured by DMA in the range of from $3.60 \times 10^6$ Pa to $5.00 \times 10^6$ Pa, from $4.00 \times 10^6$ Pa to $4.80 \times 10^6$ Pa in various embodiments, and from $4.05 \times 10^6$ Pa to $4.75 \times 10^6$ Pa in various other embodiments.

EXAMPLES

The following examples are provided to illustrate the invention. The examples are not intended to limit the scope of the invention.

Example 1

A two liter flask was charged with 169.4 grams of phenol (1.800 moles) and 1.69 grams of dodecylbenzenesulfonic acid (DDBSA). The reaction mixture was heated to 130° C. and 230.8 grams of 2-ethylhexanal (1.800 moles) was added over 60 minutes. The temperature was maintained at 130° C. by azeotropic distillation and the removal of generated water and with 2-ethylhexanal returning to the flask. After the feed was complete, the reaction temperature was increased to 150° C. with the azeotropic removal of water and was maintained for 2 hours. The temperature was then raised to 160° C. with the azeotropic removal of water and was maintained until the reaction was complete. The reaction mixture was then neutralized with 0.97 grams of 50% sodium hydroxide. The reaction mixture was then atmospherically distilled to 180° C. and further vacuumed distilled to 28 inches of mercury and 190° C. to remove phenol rich distillate. Product characterization data is provided in Table 1, below.

Example 2

A one liter flask was charged with 182.0 grams of phenol (1.934 moles) and 1.82 grams of DDBSA. The reaction mixture was heated to 130° C. and 223.2 grams of 2-ethylhexanal (1.741 moles) was added over 60 minutes. The temperature was maintained at 130° C. by azeotropic distillation and the removal of generated water and with 2-ethylhexanal returning to the flask. After the feed was complete, the reaction temperature was increased to 150° C. with the azeotropic removal of water and was maintained for 2 hours. The temperature was then raised to 160° C. with the azeotropic removal of water and maintained until the reaction was completed. The reaction mixture was then cooled to 130° C. under atmospheric reflux and 15.7 grains of 37% Formaldehyde (0.1934 moles) was added over 15 minutes. The temperature was held under reflux for 1 hour. The reaction mixture was then neutralized with 0.97 grams of 50% sodium hydroxide. The reaction mixture was then atmospherically distilled to 180° C. and further vacuumed distilled to 28 inches of mercury and 190° C. to remove phenol rich distillate. The product characterization data is provided in Table 1, below.

Example 3

A one liter flask was charged with 182.0 grams of phenol (1.934 moles) and 1.82 grams of DDBSA. The reaction mixture was heated to 130° C. and 128.1 grams of 2-ethylhexanal (1.64 moles) was added over 60 minutes. The temperature was maintained at 130° C. by azeotropic distillation and the removal of generated water and with 2-ethylhexanal returning to the flask. After the feed was complete, the reaction temperature was increased to 150° C.

with the azeotropic removal of water and was maintained for 2 hours. The temperature was then raised to 160° C. with the azeotropic removal of water and maintained until the reaction was completed. The reaction mixture was then cooled to 130° C. under atmospheric reflux and 23.5 grams of 37%
ized with 0.95 grams of 50% sodium hydroxide. Reaction mixture was then atmospherically distilled to 180° C. and furthered vacuum distilled to 28 inches of mercury and 190° C. to remove phenol rich distillate. Product characterization data is provided in Table 1, below.

TABLE 1

Characterization Data for Examples 1-5

| Polymer Example | Phenol, moles | 2-Ethylhexanal, moles | Formaldehyde (37/11), moles | 3,5,5-trimethylhexanal, moles | Mw by GPC | Softening Point, ° C. | Free Phenol, % | Brookfield Viscosity @125° C., cPs |
|---|---|---|---|---|---|---|---|---|
| 1 | 1.80 | 1.80 | NA | NA | 831 | 77 | 0.15 | 641 |
| 2 | 1.93 | 1.74 | 0.19 | NA | 949 | 90 | 0.09 | 2137 |
| 3 | 1.93 | 1.64 | 0.29 | NA | 1206 | 91 | 0.5 | 4450 |
| 4 | 1.93 | 1.35 | 0.58 | NA | 1752 | 100 | 0.25 | 6970 |
| 5 | 1.86 | 1.31 | NA | 0.56 | 993 | 81 | 0.11 | 726 |

Formaldehyde (0.29 moles) was added over 15 minutes. The temperature was held under reflux for 1 hour. The reaction mixture was then neutralized with 0.97 grams of 50% sodium hydroxide. The reaction mixture was then atmospherically distilled to 180° C. and further vacuumed distilled to 28 inches of mercury and 190° C. to remove phenol rich distillate. The product characterization data is provided in Table 1, below.

Example 4

A one liter flask was charged with 182.0 grams of phenol (1.934 moles) and 1.82 grams of DDBSA. The reaction mixture was heated to 130° C. and 173.1 grams of 2-ethylhexanal (1.35 moles) was added over 60 minutes. The temperature was maintained at 130° C. by azeotropic distillation and the removal of generated water and with 2-ethylhexanal returning to the flask. After the feed was complete, the reaction temperature was increased to 150° C. with the azeotropic removal of water and was maintained for 2 hours. The temperature was then raised to 160° C. with the azeotropic removal of water and maintained until the reaction was completed. The reaction mixture was then cooled to 130° C. under atmospheric reflux and 47.1 grams of 37% Formaldehyde (0.58 moles) was added over 15 minutes. The temperature was held under reflux for 1 hour. The reaction mixture was then neutralized with 0.97 grams of 50% sodium hydroxide. The reaction mixture was then atmospherically distilled to 180° C. and further vacuumed distilled to 28 inches of mercury and 190° C. to remove phenol rich distillate. The product characterization data is provided in Table 1, below.

Example 5

A one liter flask was charged with 175.5 grams of phenol (1.864 moles) and 0.91 grams of 99% methane sulfonic acid (MSA). The reaction mixture was heated to 130° C. and 167.7 grams of 2-ethylhexanal (1.308 moles) and 79.2 grams of 3,5,5-trimethylhexanal (0.557 moles) was added over 60 minutes. Temperature was maintained at 130° C. by azeotropic distillation and the removal of generated water and with 2-ethylhexanal and 3,5,5-trimethylhexanal returning to flask. After feed, reaction temperature was increased to 150° C. with the azeotropic removal of water and maintained for 2 hours. The temperature was then raised to 160° C. with the azeotropic removal of water and maintained until reaction was completed. Reaction mixture was then neutral- The tackifiers in Examples 1-5 were formulated with both natural rubber and synthetic rubber at 2, 4, and 6 phr. These compositions were evaluated for several properties, along with compositions prepared from a para-tert-octylphenol-formaldehyde resin. A control composition containing no tackifier was also prepared. The compositions were prepared based on the formulation listed in Table 2, below.

TABLE 2

Rubber Composition Formulation

| | Material | Amount (phr) |
|---|---|---|
| Natural Rubber | TSR20 | 40.00 |
| Synthetic Rubber | High Cis BR 1207 | 60.00 |
| Carbon Black | N660 | 50.00 |
| Activator | Zinc Oxide | 2.00 |
| Process Aid | Stearic Acid | 1.50 |
| Plasticizer | Naphthenic Oil | 8.00 |
| Antiozonant | 6PPD | 1.50 |
| Antioxidant | TMQ | 1.00 |
| Antidegradant | Akrowax 5084 | 1.50 |
| Accelerated | TBBS | 0.50 |
| Curative | Rubbermakers Sulfur | 2.00 |

A description of the materials used is provided below:
TSR20: Technically Specified Rubber Grade 20
High Cis BR 1207: High cis-1,4 polybutadiene
N660: Carbon black
6PPD: N-(1,3-dimethylbutyl)-N'-phenyl-p-phenylenediamine, an antiozonant
TMQ: 2,2,4-trimethyl-1,2-dihydroquinoline polymer, an antioxidant
Akrowax 5084: blend of microcrystalline wax and paraffin waxes, available from
Akrochem Corporation
The following test methods were used:
Shore A Hardness: ASTM D2240
Tensile Strength: ASTM D412
Subjective Tack: Subjective tack was determined by the thumb tack test. This is a subjective evaluation which is done by pressing a thumb briefly into the sample. The rating is 1-10 (1—lowest, 10—highest).
Tan delta ($\delta$) at 0° C. and 60° C.: Tan delta was determined by Dynamic Mechanical Analysis (DMA) using a RSA G2 analyzer from TA Instruments at a frequency of 10 Hz.
Elastic Modulus at 60° C.: Elastic modulus was determined by DMA using a RSA G2 analyzer from TA Instruments at a frequency of 10 Hz.

Ultimate Elongation: ASTM D412
Mooney Viscosity at 212° F.: ASTM D1646
The results of the tests are shown in Table 3 below.

TABLE 3

Test Results for Rubber Compositions

| Sample | Tackifier Resin (phr) | Hardness (points) | Tensile Strength (psi) | Subjective Tack Rating | Tan δ at 0° C. | Tan δ at 60° C. | Elastic Modulus [×10$^6$] @60° C. | Ultimate Elongation (%) | Mooney Viscosity (MU) |
|---|---|---|---|---|---|---|---|---|---|
| Control | 0 | 50 | 2644 | 2 | 0.1295 | 0.1011 | 4.16 | 620 | 37.4 |
| Reference A | 2 | 49 | 2568 | 3 | 0.1613 | 0.1469 | 3.19 | 635 | 38.95 |
| Reference A | 4 | 46 | 2329 | 4 | 0.1566 | 0.1197 | 3.69 | 660 | 36.97 |
| Reference A | 6 | 45 | 2329 | 6 | 0.167 | 0.1378 | 3.38 | 698 | 35.05 |
| Example 1 | 2 | 48 | 2594 | 2 | 0.1323 | 0.105 | 4.02 | 653 | 36.74 |
| Example 1 | 4 | 48 | 2546 | 4 | 0.1474 | 0.1155 | 4.05 | 683 | 37.08 |
| Example 1 | 6 | 47 | 2436 | 7 | 0.1515 | 0.1318 | 3.71 | 676 | 38.54 |
| Example 2 | 2 | 50 | 2558 | 2 | 0.1393 | 0.1157 | 4.51 | 634 | 47.37 |
| Example 2 | 4 | 49 | 2374 | 5 | 0.1426 | 0.1313 | 4.27 | 655 | 46.17 |
| Example 2 | 6 | 48 | 2306 | 5 | 0.1539 | 0.1476 | 4.09 | 692 | 42.82 |
| Example 3 | 2 | 49 | 2456 | 2 | 0.1317 | 0.1093 | 4.03 | 623 | 43.89 |
| Example 3 | 4 | 49 | 2276 | 4 | 0.1419 | 0.1268 | 3.98 | 635 | 43.99 |
| Example 3 | 6 | 48 | 2377 | 5 | 0.1516 | 0.1493 | 3.97 | 688 | 44.68 |
| Example 4 | 2 | 50 | 2587 | 2 | 0.1363 | 0.1188 | 4.83 | 713 | 47.64 |
| Example 4 | 4 | 49 | 2298 | 2 | 0.1484 | 0.1381 | 4.78 | 700 | 45.42 |
| Example 4 | 6 | 49 | 2129 | 2 | 0.1432 | 0.1527 | 4.91 | 742 | 43.81 |
| Example 5 | 2 | 50 | 2624 | 2 | 0.126 | 0.1043 | 4.06 | 654 | 42.35 |
| Example 5 | 4 | 48 | 2460 | 6 | 0.1489 | 0.1235 | 4.09 | 663 | 41.57 |
| Example 5 | 6 | 48 | 2438 | 7 | 0.143 | 0.1332 | 3.87 | 686 | 40.63 |

As can be seen in Table 3 above, Examples 1-5 have hardness levels that are comparable to or higher than the reference formulations.

Examples 1-5 additionally exhibit similar tensile strength to Reference A, with the exception of Example 1 at 6 phr loading.

Example 5 had higher tack values than Reference A at 4 phr and 6 phr loadings. Example 1 also had a higher tack value at 6 phr loading.

Examples 1-5 had lower tan δ values at 0° C. than Reference A. With tan δ at 60° C., Examples 1-5 had comparable values to the reference examples at 4 phr and 6 phr loadings, and lower values at 2 phr loading.

Example 4 had higher ultimate elongation than the reference examples. The ultimate elongation values for Examples 1-3 and 5 were comparable to the reference examples.

Examples 1-5 exhibited higher viscosity over the control example. Example 1 had a viscosity that was comparable to Reference A.

Example 4 had the highest elastic modulus value at 60° C.

While the present invention has been described and illustrated by reference to particular embodiments, those of ordinary skill in the art will appreciate that the invention lends itself to variations not necessarily illustrated herein.

What is claimed is:

1. A composition comprising
   a rubber component selected from the group consisting of
      a rubber polymer, a synthetic rubber polymer, and combinations thereof; and
   an alkylphenol resin condensation product which is a reaction product comprising:
      at least one phenolic monomer selected from the group consisting of phenol, cresol, resorcinol, xylenol, ethyl phenol, alkylresorcinols, and combinations thereof;
      formaldehyde;
      an organic solvent selected from the group of an aliphatic hydrocarbon solvent, an aromatic hydrocarbon solvent or combination therein, wherein the organic solvent forms an azeotrope with water;
      an acid catalyst;
      a base catalyst;
      water; and
      at least one alkyl aldehyde having from 5 to 12 carbon atom alkyl groups, wherein the alkylphenol resin condensation product comprises a resole alkylphenol resin condensation product.

2. The composition of claim 1, wherein the alkylphenol resin condensation product does not contain octylphenol or nonylphenol.

3. The composition of claim 1, wherein the alkyl aldehyde is selected from the group consisting of 3,5,5-trimethyl hexanal, nonanal, 2-ethyl hexanal, and combinations thereof.

4. A composition in accordance with claim 1, wherein the alkylphenol resin condensation product is present in the composition in a range of from 1 phr to 10 phr.

5. A composition in accordance with claim 1, wherein the synthetic rubber polymer is selected from the group consisting of styrene butadiene rubber, polybutadiene rubber, halogenated butyl rubber, butyl rubber, polyisoprene rubber, styrene/isoprene/butadiene rubber, and combinations thereof.

6. A composition in accordance with claim 1, having a tan δ at 0° C. as measured by Dynamic Mechanical Analysis in the range of from 0.12 to 0.17.

7. A composition in accordance with claim 1, having a tan δ at 60° C. as measured by Dynamic Mechanical Analysis in the range of from 0.10 to 0.16.

8. A composition in accordance with claim 1, having an ultimate elongation as measured by ASTM D412 in the range of from 550% to 800%.

9. A composition in accordance with claim 1, having an elastic modulus at 60° C. in the range of from 3.60×106 Pa to 5.00×106 Pa.

10. An article of manufacture prepared using the composition of claim 1, wherein the article is selected from the group consisting of a tire, a tire tread, a tire shoulder, a tire sidewall, a rubber belt, and a rubber hose.

* * * * *